US008453821B2

(12) United States Patent
Hutter et al.

(10) Patent No.: US 8,453,821 B2
(45) Date of Patent: Jun. 4, 2013

(54) DEVICE FOR PACKAGING ARTICLES (75) Inventors: Alban Hutter, Reit im Winkl (DE); Christian Canalicchio, Bad Endorf (DE)

(73) Assignee: Krones AG, Neutraubling (DE)

( * ) Notice: Subject to any disclaimer, the term of this patent is extended or adjusted under 35 U.S.C. 154(b) by 266 days.

(21) Appl. No.: 12/592,249

(22) Filed: Nov. 20, 2009

(65) Prior Publication Data
US 2010/0140047 A1 Jun. 10, 2010

(30) Foreign Application Priority Data

Nov. 28, 2008 (DE) .......................... 10 2008 059 622

(51) Int. Cl.
*B65G 47/90* (2006.01)
(52) U.S. Cl.
USPC .......................... 198/346.2; 198/614; 198/802
(58) Field of Classification Search
None
See application file for complete search history.

(56) References Cited

U.S. PATENT DOCUMENTS

| | | | | | |
|---|---|---|---|---|---|
| 4,265,360 | A | * | 5/1981 | Khodos | 198/774.1 |
| 4,461,379 | A | | 7/1984 | Papp et al. | |
| 5,072,573 | A | * | 12/1991 | Tisma | 53/252 |
| 5,282,529 | A | | 2/1994 | Schwamme et al. | |
| 5,305,892 | A | | 4/1994 | Kronseder | 209/523 |
| 5,441,380 | A | | 8/1995 | Horikawa | |
| 5,586,638 | A | | 12/1996 | Mojden et al. | 198/19.1 |
| 5,636,966 | A | * | 6/1997 | Lyon et al. | 414/791.6 |
| 5,995,646 | A | * | 11/1999 | Yonezawa et al. | 382/141 |
| 6,032,788 | A | | 3/2000 | Smithers | 198/817 |
| 6,152,284 | A | * | 11/2000 | Sandberg et al. | 198/432 |
| 6,193,074 | B1 | * | 2/2001 | Baum et al. | 209/606 |
| 6,315,101 | B1 | * | 11/2001 | Hugon | 198/370.07 |
| 2006/0254886 | A1 | | 11/2006 | Cash, III et al. | 198/850 |

FOREIGN PATENT DOCUMENTS

| | | |
|---|---|---|
| DE | 609 213 C | 2/1935 |
| DE | 40 28 207 A1 | 3/1992 |
| DE | 196 14 657 A1 | 10/1997 |
| DE | 20 2007 005 034 U1 | 8/2008 |
| EP | 0 856 465 B1 | 8/1989 |
| EP | 1 749 750 A1 | 2/2007 |
| FR | 2 607 793 A1 | 6/1988 |
| FR | 2 626 858 A1 | 8/1989 |
| FR | 2 639 039 A1 | 5/1990 |

OTHER PUBLICATIONS

English translation of claims of DE 20 2007 005 034 U1, 3 pages.

* cited by examiner

*Primary Examiner* — Kavel Singh
(74) *Attorney, Agent, or Firm* — Davidson, Davidson & Kappel, LLC (57) ABSTRACT

A device for transporting articles within a packaging machine is disclosed. The device includes at least one conveying system for the articles to be packaged or for the packaging units for the articles to be packaged. The conveying system includes a continuously circulating transport track. The at least one conveying system has several trays that can be connected to each individual transport track. Each conveying system is configured with an upper level and a lower level. A first lifting unit is associated with each conveying system at the beginning and a second lifting unit is associated with each conveying system at the end, said lifting units moving the trays at the beginning and at the end of the conveying system between the upper level and the lower level.

20 Claims, 7 Drawing Sheets

DEVICE FOR PACKAGING ARTICLES

This claims the benefit of German Patent Application No 10 2008 059 622.1, filed Nov. 28, 2008 and hereby incorporated by reference herein.

The present invention relates to a device for packaging articles. In particular, the invention relates to a device for transporting articles within a packaging machine, comprising at least one conveying system for the articles to be packaged or for the packaging units for the articles to be packaged. The conveying system consists of a continuously circulating transport track. The conveying system has a beginning and an end.

BACKGROUND

The state of the art discloses various methods and devices with which articles can be inserted into packaging units. Ultimately, the articles that have been inserted into the packaging units reach another packaging or picking machine in which the articles are already combined to form the various shipments to the customers.

U.S. Pat. No. 6,032,788 discloses a multi-rail transport system for printed circuit boards. The system has a first shuttle and a second shuttle that can be moved along the rails. The shuttles are configured in such a way that they can move essentially parallel to each other along the first and second longitudinal axes. The shuttles themselves can selectively engage with the rails.

U.S. Pat. No. 5,586,638 discloses a conveying system comprising several lines for printed circuit boards of various sizes. The printed circuit boards are transported within and/or between automatic electronic components on pairs of rails. Here, too, the shuttles are configured in such a way that they can selectively engage with the appropriate rails and can execute the transport movement along the rails.

U.S. Patent Appln. No. 2006/0254886 A1 discloses a conveying system for articles. The conveying system comprises a conveyor belt that can be moved by a transport chain. The surface of the conveyor belt has a plurality of conveyor plates that are arranged adjacent to each other and that are configured to carry the articles. Each of the plates is independent and can be detachably attached to the transport chain.

German patent application DE 40 28 207 A1 discloses a transport system for the textile industry. The transport system, in which carrier elements that can be moved independently of each other by coupling parts with slanted, circulating conveyor belts, comprises several transport lines. The coupling parts are switched on and off by switching members that can be actuated through a relative motion of the switching member and the carrier element when the carrier elements reach stops that extend into the transport path of the carrier elements. The carrier elements each have an adapter for connecting a handling part configured for purposes of handling the product that is to be transported.

European patent application EP 1 749 750 A1 discloses a packaging machine for processing shuttles that hold individual portions. For this purpose, a shuttle transport system with conveyor belts is provided. A shuttle control system, an ejection station for incomplete shuttles and a correction station for incomplete shuttles are likewise provided.

European patent EP 0 856 465 B1 discloses a reverse tray transport for picker lines. In this method, a picker line places individual products into containers that hold a certain number of individual products. The individual products and the containers are not transported in a parallel flow. The arrival in the working area of the picker of the next container that is to be filled is regulated. The individual products are transported there irregularly or unordered. During the processing of the individual products, the speed of the arrival of the individual products, the transport speed of the containers and/or the working speed of the pickers are regulated in such a way that the containers leaving the working area of the last picker are exactly completely filled with the products in question.

SUMMARY OF THE INVENTION

It is an object of the present invention to create a device for transporting articles within a packaging machine such that the at least one transport path of the conveying systems and the at least one robot associated with the conveying system are utilized efficiently for the processing step.

With the device according to the invention for transporting articles within a packaging machine, the at least one conveying system has several trays. The several trays can be connected to each individual transport track, whereby the conveying system has an upper level and a lower level. By the same token, a first lifting unit and a second lifting unit are associated with the conveying system. The first lifting unit and the second lifting unit are provided in order to move the trays at the beginning and at the end of the conveying system between the upper level and the lower level.

According to an embodiment of the packaging machine, two conveying systems are provided for the articles to be packaged. The conveying systems of the device are arranged in parallel, whereby the transport direction of the two conveying systems is the same relative to the upper level. The two conveying systems are driven in alternating cycles in order to optimally utilize the at least one robot. The at least one robot straddles the two conveying systems, so that it can execute manipulations on both conveying systems.

According to another embodiment of the packaging machine, three conveying systems are provided for the articles to be packaged. The three conveying systems of the device are arranged in parallel, whereby the transport direction of two of the conveying systems is the same relative to the upper level. The third conveying system can have an opposite transport direction in order to supply the device with the objects that are to be processed. The two conveying systems that have the same conveying direction are driven in alternating cycles in order to optimally utilize the at least one robot. Here, too, the at least one robot straddles the two conveying systems that run in the same transport direction, so that it can execute manipulations on both conveying systems.

By moving the trays from the upper level to the lower level, it can be achieved that the trays in the lower level can be transported back to the beginning of the conveying system. During this return transport from the end of the conveying system to the beginning of the conveying system, the transport of articles in the trays from the beginning of the conveying system to the end of the conveying system is not hindered. Consequently, the invention has the advantage that trays that are continuously emptied are available at the beginning of the conveying system to receive new articles or packaging units. This allows the smooth packaging of the articles but does not reduce the cycle time of the device.

As already described above, the conveying system on the upper level may have a transport direction that transports the trays from the beginning to the end of the transport system. By the same token, the transport system has an opposite transport direction on the lower level, which takes the trays back to the beginning of the conveying system.

In order to transport the trays, a transport track can be provided that consists of at least one continuous chain with a plurality of chain link studs to which the trays are firmly connected during the movement of the transport track. At the beginning and at the end of the conveying system, the trays can be coupled to or uncoupled from the transport track. When the trays are coupled to the transport track, the trays are automatically aligned relative to the transport track. The trays are each provided with at least two opposing toothed racks so that they can be aligned and coupled to the transport track. These toothed racks make it possible to compensate for any tolerances that might be present in the transport track, which is configured as a chain. The clamping that is likewise effectuated by the toothed rack means that there is no need for any further centering of the tray in the processing stations.

The conveying system on which the trays are laid can go to multiple processing stations. These processing stations are arranged in parallel to each conveying system.

The transport of the trays by the conveying system can be cycled. In this manner, the processing stations can remain at the various processing stations for a predefined period of time. Consequently, handling systems such as, for example, robots, that are associated with the processing stations can transfer the appropriate articles from the processing stations onto the transport system or else can transfer the articles from the transport system into the processing stations. If several conveying systems are arranged next to each other, it is likewise conceivable for the articles to be transferred from one conveying system to the other one at the processing stations.

The trays themselves may have several latching elements that can be made to engage with the transport track in the direction of the upper level or lower level of the conveying system. The transport track itself is preferably configured in the form of a chain. Here, the latching elements are pairs of toothed racks opposite from each other which, depending on the position of the trays, engage in the chain and align themselves relative to the chain link studs of the transport track. Once the trays have been aligned relative to the chain link studs of the chain, they are clamped and thus a non-positive connection is established between the transport track that is configured as a chain. In order to achieve an alignment, one tooth of the toothed rack is configured so as to pivot. This likewise brings about an automatic alignment of the trays with the chain link studs of the transport track and facilitates the intermeshing of the teeth of the toothed rack between the chain link studs. Once the teeth of the toothed rack are between the chain link studs, the clamping is effectuated pneumatically.

The clamping may be carried out once each tray is in position with the chain link studs, that is to say, the teeth of the toothed rack extend through the spaces between the chain link studs.

The device according to the invention, as already mentioned, can be made up modularly of several individual conveying systems. In a preferred embodiment, three conveying systems are arranged in parallel with respect to each other, whereby all of the individual conveying systems in the upper level have the same transport direction. It is likewise conceivable for the multiple conveying systems to each have different transport directions in the upper level.

Below, embodiments will serve to explain the invention and its advantages in greater depth with reference to the accompanying figures. The size relationships of the individual elements relative to each other in the figures do not always correspond to the actual size relationships, since some of the shapes are depicted in simplified form and other shapes are depicted in enlarged form relative to the other elements for the sake of clarity.

DETAILED DESCRIPTION

The identical reference numerals are used for elements of the invention that are the same of that have the same effect. Moreover, for the sake of clarity, only the reference numerals that are needed for the description of a particular figure are used in the individual figures. The depicted embodiments are merely examples of how the device according to the invention can be configured and thus do not constitute an actual restriction of the invention.

Figure 1:
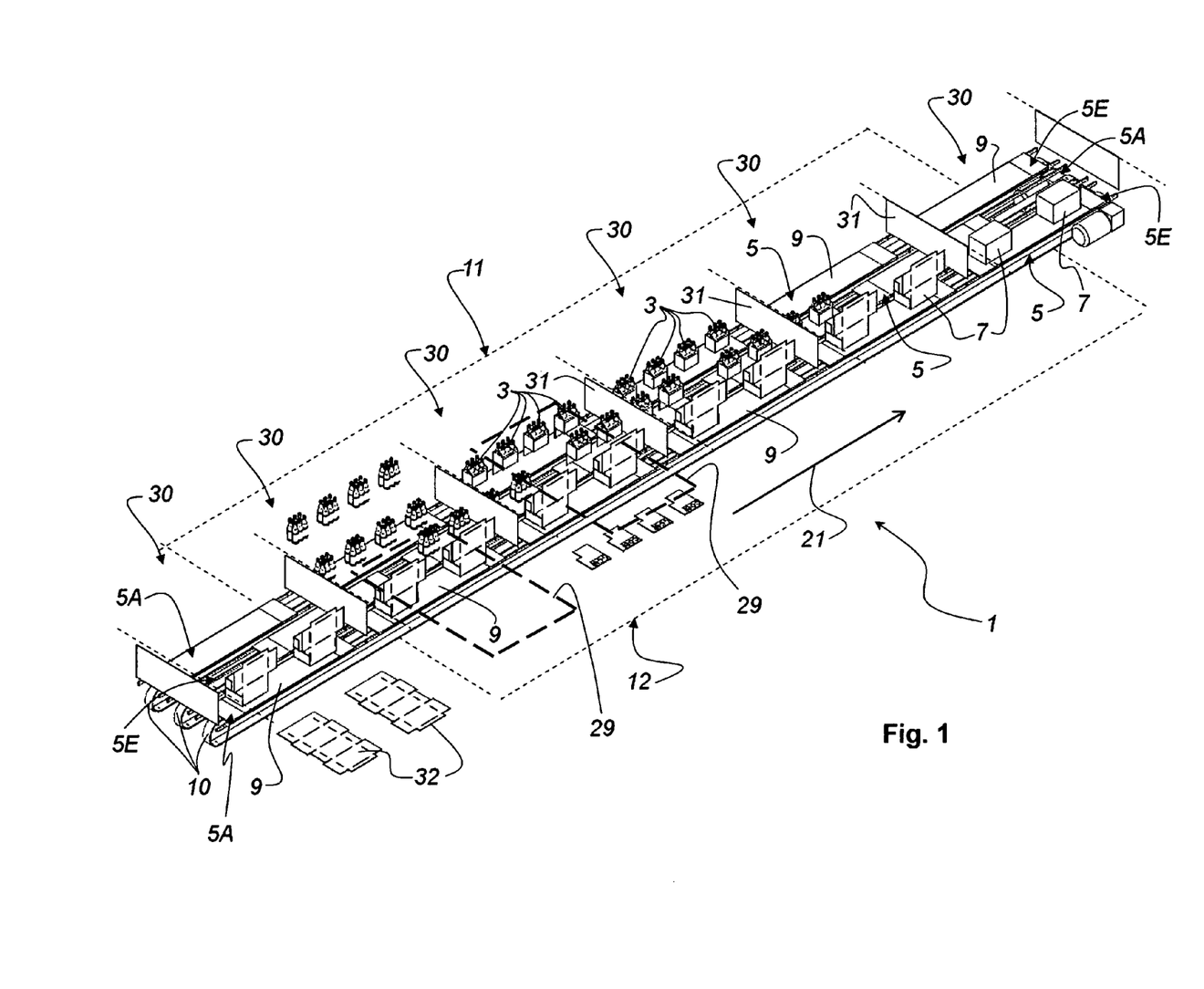
FIG. 1 shows a perspective view of a unit for packaging articles that consists of several conveying systems.

FIG. 1 shows a perspective view of the device 1 for transporting articles 3. This device 1 can be used, for example, in a packaging machine. In the depiction shown here, three conveying systems 5 are arranged parallel to each other. In the arrangement shown in FIG. 1, the individual conveying systems 5 are arranged parallel to each other in such a way that the single transport direction 21 of the individual conveying systems 5 is alternately reversed. In the embodiment shown here, two of the conveying systems 5 run in the same direction. The third conveying system 5 can be driven in the opposite direction in order to feed the articles that are to be processed.

It is obvious to the person skilled in the art that the embodiment shown in FIG. 1 is merely one of many arrangement possibilities. The arrangement and the transport direction 21 of the individual conveying systems can be configured as a function of the envisaged objective as to how the articles 3 of the device 1 are to be packaged using the device 1.

On each conveying system 5, there are several trays 9 that, for every single conveying system 5, can be moved along a selected transport direction 21 by means of a circulating transport track 10. Partition walls 31 indicate the individual processing stations 30 at which the articles can be transferred from the processing station, for example, onto the individual conveying systems 5. For this purpose, a robot 29 can be provided at the processing stations 30, said robot straddling all of the conveying systems 5 or else only the two conveying systems 5 that run in the same transport direction 21. In order to carry out the processing, the conveying systems 5 are driven in cycles. This means that the conveying system 2 that stops is the one where the processing is being carried out. Accordingly, this is done alternately between the individual conveying systems 5. By the same token, it is possible for the individual articles 3 to be placed into prepared containers 7 at the processing station 30. Thus, the two-dimensional blanks 32 that serve to create the packaging units 7 are made available at the processing station 30 that follows the beginning 5A of the conveying system 5. In the subsequent processing station 30, the articles that have been bundled into groups of six, in this case bottles, are transferred to the conveying system 5 in the embodiment shown here. In a next work station, for example, the groups of six can then be provided with a wrapping. Subsequently, it is conceivable for the groups of six with their wrapping to be transferred into the packaging units 7 provided for this purpose. As a rule, several of the combined groups of six are placed into the packaging units provided for this purpose. At the last work station 30, which is located before the end 5E of the conveying system 5, the packaging units 7 are ultimately sealed. At this last work station 30, the packaging units 7 can be removed from the conveying system 5 and taken to another processing unit (not shown here).

Figure 2:
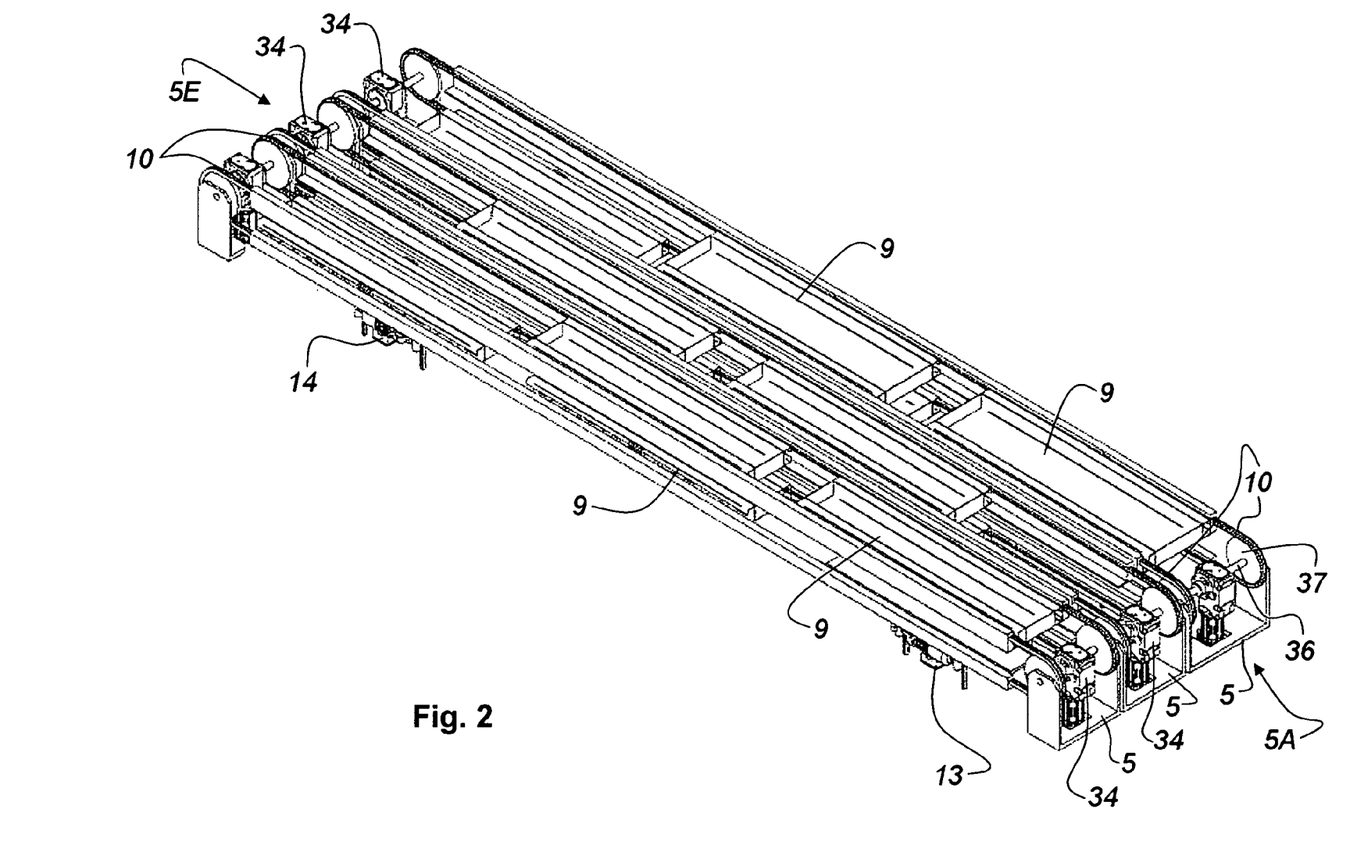
FIG. 2 shows a perspective view of device for packaging articles, whereby the individual articles have been omitted in order to more clearly depict the device.

FIG. 2 shows a simplified perspective view in which three conveying systems 5 are likewise arranged parallel to each other, thereby forming the unit according to the invention. The number of conveying systems 5 that can be modularly combined to form one unit for transporting articles to be packaged should not be construed as a restriction of the invention. It is obvious to the person skilled in the art that, depending on what is needed, a number of conveying systems 5 can be joined together. It is likewise evident that the length of the individual conveying systems 5 depends on the requirements of the user. In the depiction shown here, each conveying system 5 has a motor 34 at the beginning 5A and at the end 5B, said motor 34 driving an axle 36 that supports a gear 37 on both sides. A transport track 10, configured in the form of a chain, runs continuously over the pair of gears provided at the beginning 5A and at the end 5B. The trays 9 engage with the transport track 10 so that they can be transported according to the envisaged transport direction 21 of the upper level. Likewise, the depiction shown in FIG. 2 makes it clear that each conveying system 5 is associated with a first lifting unit 13 along the periphery. Likewise, a lifting unit 14 is provided at each end 5E of each conveying system 5. By the same token, the mode of operation of this lifting unit will be described in greater detail in the following figures.

Figures 3, 4:
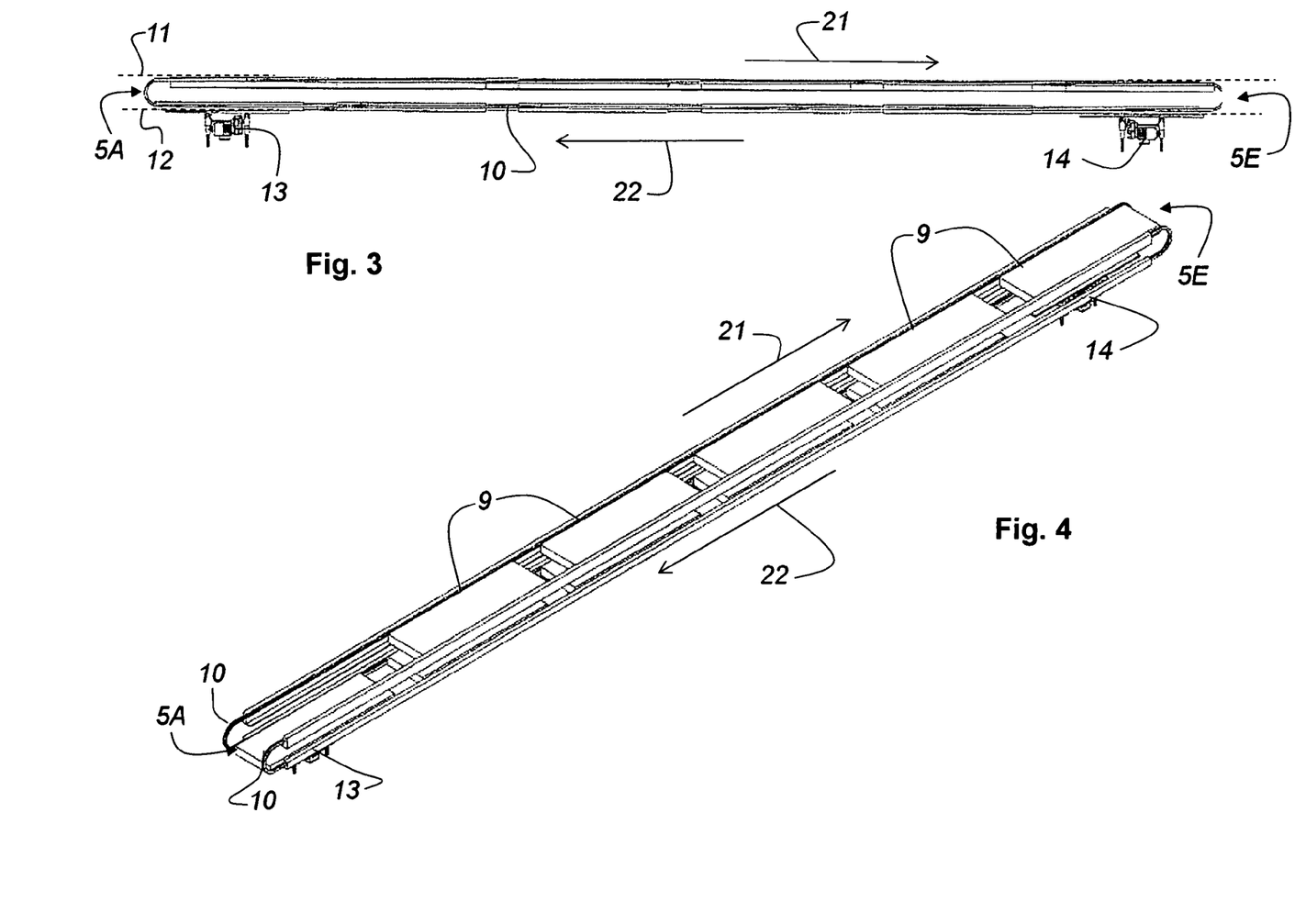
FIG. 3 shows a side view of a module of the conveying system.
FIG. 4 shows a perspective view of a module of the conveying system according to the invention.

FIG. 3 shows a side view of a module of the conveying system 5 according to the invention. The conveying system 5 according to the invention has an upper level 11 and a lower level 12. As already mentioned, a first lifting unit 13 is associated with the beginning 5A of the conveying system 5. By the same token, a second lifting unit 14 is associated with the end 5E of the conveying system 5. The conveying system carries several trays 9 that, in the depiction shown in FIG. 3, have a transport direction 21 that runs from the beginning 5A of the conveying system 5 to the end 5E of the conveying system 5. Due to the continuously circulating transport track 10, the transport direction 22 on the lower level 12 of the conveying system is opposite from the transport direction 21 of the upper level. At the end 5E of the conveying system 5, the trays are lowered by the lifting unit from the upper level 11 to the lower level. For this purpose, the trays 9 are uncoupled from the transport track and, after being lowered by the second lifting unit 14, they are coupled to the transport track 10 once again. At the beginning 5A of the conveying system, the trays that were fed by the transport track along the conveying direction 22 are uncoupled from the transport track by the first lifting unit and are lifted onto the upper level 12 by the second lifting unit 13. There, the tray is coupled to the transport track 10 once again.

FIG. 4 shows a perspective view of a module of the conveying system 5 according to the invention. In the situation shown here, a tray 9 was just transported along the lower level 12 in the transport direction 22 to the beginning 5A of the conveying system 5. However, this tray 9 has not yet been lifted onto the upper level 11 of the conveying system. Accordingly, a tray 9 is located at the end 5E of the conveying system 5. This tray 9 still has to be lowered onto the lower level 12 by the second lifting unit 14 and coupled there to the transport tracks 10.

Figure 5:
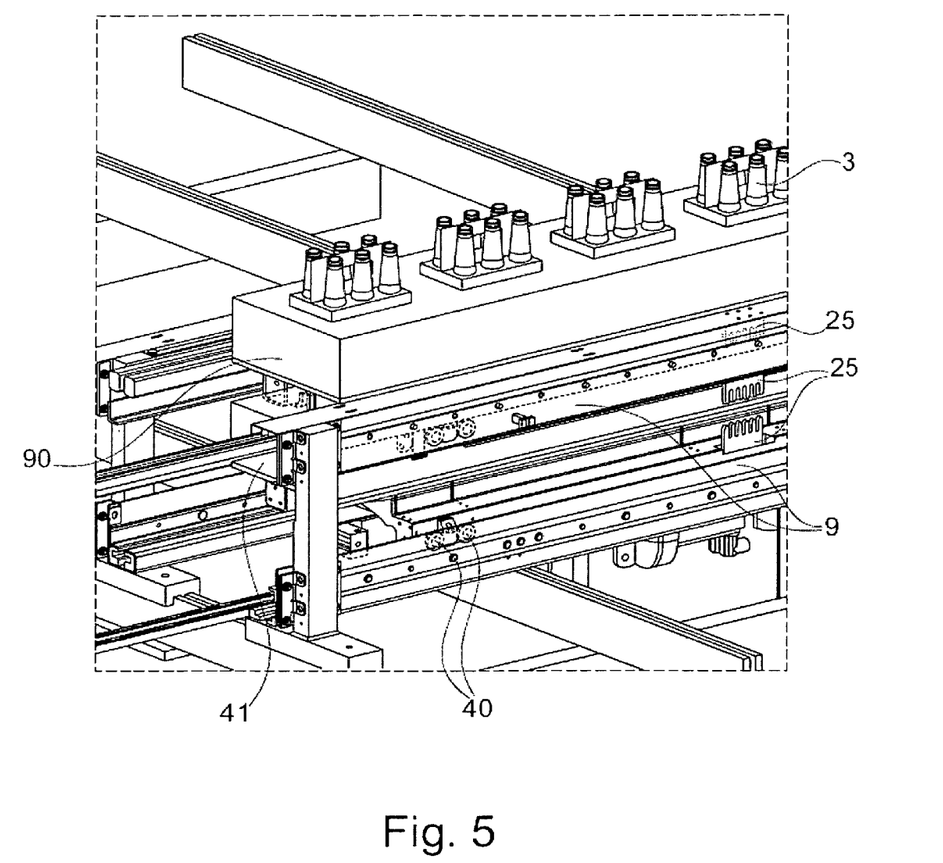
FIG. 5 shows a partial perspective view of the device in which the transport rails for the trays for the articles are depicted.

FIG. 5 shows a partial perspective view of the device according to the invention in which several articles 3 have already been combined to form a pack 50 in a tray 9. These packs 50 are transported with the tray 9 to the next processing station. As can be seen in FIG. 5, the trays 9 have latching elements 25 that are oriented in the direction of the upper level 11 and of the lower level 12. As already mentioned, the latching elements 25 cooperate with the transport track 10 so that, due to this cooperation, the trays can be transported. In the embodiment shown here, tubs 90 have been placed onto the trays 9, and the articles 3 or packs 50 that are to be processed or handled can be lowered into these tubs 90. By the same token, there are parallel rails 51 in which the trays 9, which have been provided with rollers 40, run.

Figure 6:
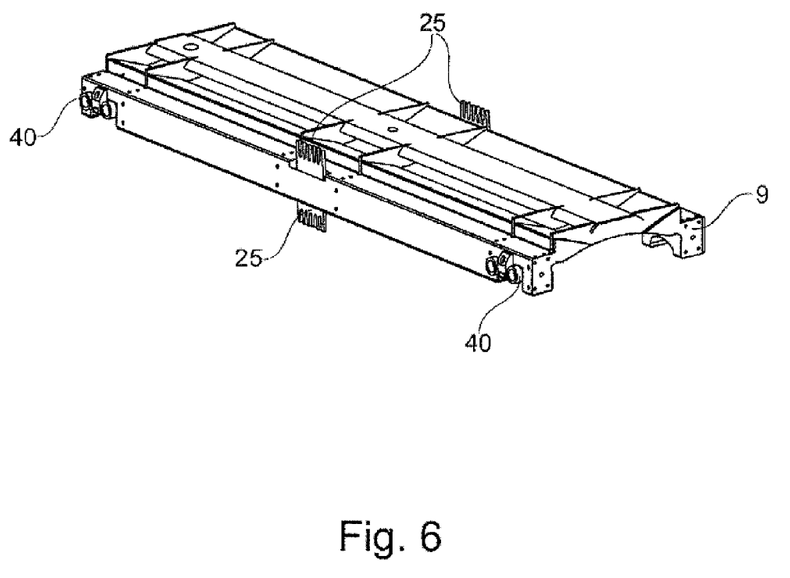
FIG. 6 shows a perspective view of a tray that can be made to engage with the transport track.

FIG. 6 shows a perspective detailed view of a tray 9 that is used in the device according to the invention. On both ends, the tray 9 has rollers 40 that are affixed in order to guide the tray in the rails 41 provided for this purpose. The latching elements 25 are installed in the middle of the tray 9 and they engage with the appertaining transport track 10 or rather, with the transport track configured as a chain. As already mentioned in the description of FIG. 5, a receptacle or a tub or similar object can be placed onto the tray 9, onto which ultimately, the articles to be processed or the packaging units can be transported with the device according to the invention.

Figure 7:
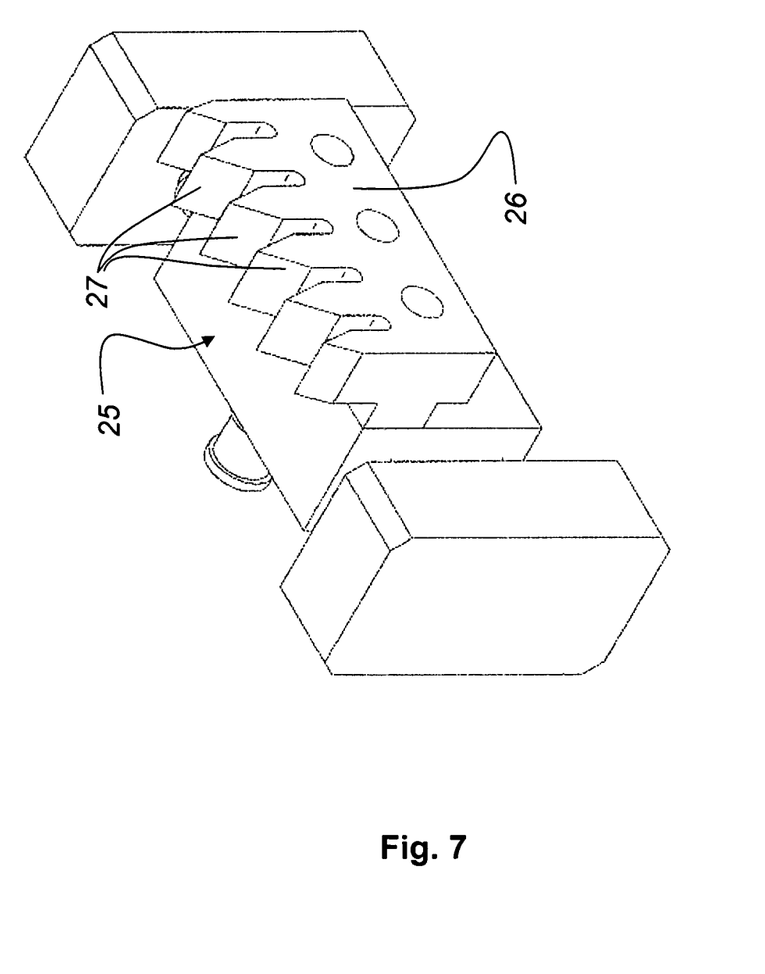
FIG. 7 shows a perspective view of a latching element that, in the embodiment shown here, is configured as a toothed rack that can engage with the appropriate transport track so that the tray can be moved in the transport direction by the device.

FIG. 7 shows a perspective detailed view of an embodiment configured as a latching element 25 that engages with the transport track 10 in order to transport the tray 9. As can be seen in FIG. 5, the latching element 25 is affixed to the tray 9. A toothed rack 26 is configured on the latching element 25 so that the latching element 25 can engage with the transport track 10. This toothed rack 26 latches in the transport track 10 that is configured as a chain, thereby effectuating the transport of the trays in the transport direction 21 in the upper level or in the transport direction 22 in the lower level of the conveying system 5. The transport track 10 comprises a plurality of spaced chain link studs 19 (see FIGS. 8a and 8b) into whose spaces the individual teeth 27 of the toothed rack 26 engage. Thus, each individual tray 9 can be automatically aligned relative to the transport chain.

Figure 8A:
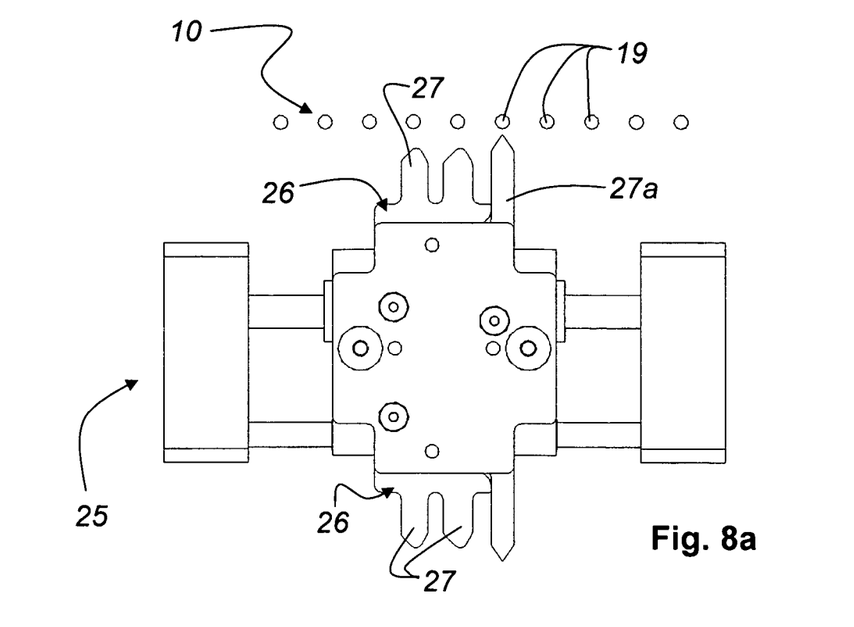
FIG. 8a shows an embodiment of the latching element that is in the process of approaching the transport track in order to be connected to it.

FIG. 8a shows another embodiment of the latching element 25 that is in the process of approaching the transport track 10 in order to be connected to it for the transport. The latching element 25 likewise has a toothed rack 26 with several teeth 27. In the situation shown in FIG. 8a, the tray 9 and consequently also the latching element 25 are lifted. The teeth 27 and 27a coincidentally come into contact with the chain link studs 19 of the transport track 10. One tooth 27a of the toothed rack 26 is configured so as to pivot, in order to facilitate the engagement of the toothed rack 26 between the chain link studs 19 of the transport track 10.

Figure 8B:
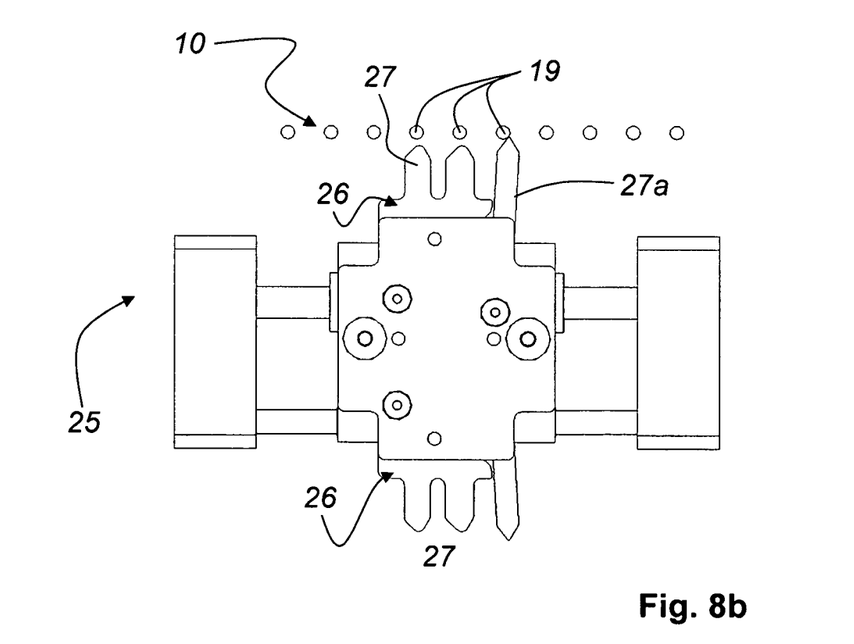
FIG. 8b shows the embodiment of the latching element depicted in FIG. 8a, whereby the latching element is aligned relative to the transport track due to the special configuration of the toothed rack.

FIG. 8b shows the embodiment of the latching element depicted in FIG. 8a, whereby the latching element 25 is aligned relative to the transport track 10 due to the special configuration of the moveable tooth 27a of the toothed rack 26. The pivoting tooth 27a of the toothed rack 26 avoids the chain link studs 19 and thus guides all of the teeth 27 and 27a of the toothed rack 26 of the latching element 25 into the spaces of the chain link studs 19 of the transport track 10. This translates into an automatic alignment of the trays 9 with the chain link studs 19 of the transport track 10.

The pivoting tooth 27a is not envisaged for clamping purposes. It serves as an insertion aid for the toothed rack 26 into the transport track 10 that is configured as a chain. If a given tray 9 is in the aligned position and the chain link studs 19 are situated in the spaces between the teeth 27 and 27a of the toothed rack 26, then the clamping can be carried out. The trays 9 are thus exactly positioned relative to the transport track 10 that is configured as a chain.

The invention was described with reference to preferred embodiments. However, it is obvious for the person skilled in the art that modifications and changes can be made without departing from the protective scope of the following claims.

What is claimed is:

1. A device for transporting articles within a packaging machine, comprising:
    at least one conveying system for articles to be packaged or for packaging units for the articles to be packaged, whereby the conveying system includes a continuously circulating transport track and whereby each conveying system has a beginning and an end;
    several processing stations being provided along the at least one conveying system, and a robot being associated with at least one of these processing stations;
    the at least one conveying system having several trays connectable to each individual transport track, the conveying system being configured with an upper level and a lower level;
    a first lifting unit being associated with the conveying system at the beginning and a second lifting unit being associated with the conveying system at the end, the first and second lifting units moving the trays at the beginning and at the end of the conveying system between the upper level and the lower level;
    wherein the trays have several latching elements that, if necessary, can be made to engage with the transport track in the direction of the upper level or lower level of the conveying system;
    wherein the latching elements are configured as pairs of toothed racks opposite from each other which have several teeth and which, depending on the position of the trays, engage in the transport track that is configured as a chain and align themselves relative to chain link studs of the transport track.

2. The method as recited in claim 1 wherein the at least one conveying system includes two conveying systems for the articles to be packaged or for the packaging units,
    wherein a transport direction of upper levels of the two conveying systems is the same.

3. The device as recited in claim 2 wherein the two conveying systems are driven in alternating cycles so that the robot carries out processing on the conveying system that is not being driven at that moment.

4. The device as recited in claim 1 wherein the two conveying systems are parallel to each other.

5. The device as recited in claim 1 wherein the at least one conveying system includes at least three conveying systems for the articles to be packaged or for the packaging units, and in that the transport direction of at least two of the conveying systems is the same relative to the upper level.

6. The device as recited in claim 1 wherein each conveying system has one transport direction on the upper level, and the trays are transported from the beginning to the end, and each conveying system having an opposite transport direction on the lower level, taking the trays back to the beginning of the conveying system.

7. The device as recited in claim 1 wherein the trays are firmly connected to the chain link studs during the movement of the transport track, whereby, at the beginning and at the end of the conveying system, the trays can be coupled to or uncoupled from the transport track, and, when the trays are coupled to the transport track, the trays can be automatically aligned relative to the transport track.

8. The device as recited in claim 1 wherein the several processing stations are parallel to the conveying system.

9. The device as recited in claim 8 wherein transport of the trays by the conveying system is cycled, and the trays remain at the various processing stations for a predefined period of time.

10. The device as recited in claim 1 wherein, in the case of the alignment of the trays brought about by the clamping of the toothed rack, the teeth of the toothed rack are arranged in spaces between chain link studs of the transport track.

11. The device as recited in claim 1 wherein the device is made up modularly of several individual conveying systems.

12. The device as recited in claim 1 wherein one tooth of the toothed rack is configured so as to pivot in order to bring about an automatic alignment of the trays with chain link studs of the transport track.

13. The device as recited in claim 12 wherein the pivoting tooth inserts into the latching element when the teeth of the particular tray are in position with the chain link studs.

14. The device as recited in claim 1 wherein the several trays of the conveying systems are removably attachable to each individual transport track of the respective conveying system.

15. The device as recited in claim 14 wherein one tooth of the toothed rack is configured so as to pivot in order to bring about an automatic alignment of the trays with chain link studs of the transport track.

16. The device as recited in claim 15 wherein the pivoting tooth inserts into the latching element when the teeth of the particular tray are in position with the chain link studs.

17. A device for transporting articles within a packaging machine, comprising:
    at least one conveying system for articles to be packaged or for packaging units for the articles to be packaged, whereby the conveying system includes a continuously circulating transport track and whereby each conveying system has a beginning and an end;
    several processing stations being provided along the at least one conveying system, and a robot being associated with at least one of these processing stations;
    the at least one conveying system having several trays connectable to each individual transport track, the conveying system being configured with an upper level and a lower level;
    a first lifting unit being associated with the conveying system at the beginning and a second lifting unit being associated with the conveying system at the end, the first and second lifting units moving the trays at the beginning and at the end of the conveying system between the upper level and the lower level;
    wherein the trays have several latching elements that, if necessary, can be made to engage with the transport track in the direction of the upper level or lower level of the conveying system;

wherein, in the case of the alignment of the trays brought about by the clamping of the toothed rack, the teeth of the toothed rack are arranged in spaces between chain link studs of the transport track.

18. The device as recited in claim 17 wherein the latching elements are configured as pairs of toothed racks opposite from each other which have several teeth and which, depending on the position of the trays, engage in the transport track that is configured as a chain and align themselves relative to chain link studs of the transport track.

19. A device for transporting articles within a packaging machine, comprising:
- at least one conveying system for articles to be packaged or for packaging units for the articles to be packaged, whereby the conveying system includes a continuously circulating transport track and whereby each conveying system has a beginning and an end;
- several processing stations being provided along the at least one conveying system, and a robot being associated with at least one of these processing stations;
- the at least one conveying system having several trays connectable to each individual transport track, the conveying system being configured with an upper level and a lower level; and
- a first lifting unit being associated with the conveying system at the beginning and a second lifting unit being associated with the conveying system at the end, the first and second lifting units moving the trays at the beginning and at the end of the conveying system between the upper level and the lower level,
- wherein the trays have several latching elements that, if necessary, can be made to engage with the transport track in the direction of the upper level or lower level of the conveying system,
- wherein the latching elements are configured as pairs of toothed racks opposite from each other which have several teeth and which, depending on the position of the trays, engage in the transport track that is configured as a chain and align themselves relative to chain link studs of the transport track.

20. A device for transporting articles within a packaging machine, comprising:
- at least one conveying system for articles to be packaged or for packaging units for the articles to be packaged, whereby the conveying system includes a continuously circulating transport track and whereby each conveying system has a beginning and an end;
- several processing stations being provided along the at least one conveying system, and a robot being associated with at least one of these processing stations;
- the at least one conveying system having several trays connectable to each individual transport track, the conveying system being configured with an upper level and a lower level; and
- a first lifting unit being associated with the conveying system at the beginning and a second lifting unit being associated with the conveying system at the end, the first and second lifting units moving the trays at the beginning and at the end of the conveying system between the upper level and the lower level,
- wherein the trays have several latching elements that, if necessary, can be made to engage with the transport track in the direction of the upper level or lower level of the conveying system,
- wherein, in the case of the alignment of the trays brought about by the clamping of the toothed rack, the teeth of the toothed rack are arranged in spaces between chain link studs of the transport track.

* * * * *